United States Patent
Streit

(10) Patent No.: US 6,211,465 B1
(45) Date of Patent: Apr. 3, 2001

(54) SEALED CONNECTING BOX FOR FITTING A TUBE TO AN APERTURE OF A WALL

(75) Inventor: Bernard Streit, Anteuil (FR)

(73) Assignee: Sofanou S.A., Clerval (FR)

( * ) Notice: Subject to any disclaimer, the term of this patent is extended or adjusted under 35 U.S.C. 154(b) by 0 days.

(21) Appl. No.: 09/418,544

(22) Filed: Oct. 14, 1999

Related U.S. Application Data

(63) Continuation of application No. PCT/IB97/01285, filed on Oct. 17, 1997.

(30) Foreign Application Priority Data

Apr. 16, 1997 (FR) .................................................. 97 04924

(51) Int. Cl.[7] .................................................. H02G 3/18
(52) U.S. Cl. ............................ 174/65 G; 248/56; 16/2.1
(58) Field of Search ............................ 174/65 G, 65 R, 174/49, 59, 151, 152 G, 153 G, 153 R, 135; 248/56; 16/2.1, 2.2

(56) References Cited

U.S. PATENT DOCUMENTS

| | | |
|---|---|---|
| 3,836,269 | 9/1974 | Koscik . |
| 4,494,779 | 1/1985 | Neff et al. . |
| 5,015,804 | * 5/1991 | Nattel et al. ................. 174/65 SS |
| 5,318,459 | * 6/1994 | Shields ................................ 439/529 |
| 5,736,677 | * 4/1998 | Sato et al. ........................ 174/65 G |
| 5,806,139 | * 9/1998 | Anderson et al. ..................... 16/2.1 |
| 5,886,298 | * 3/1999 | Dgoud ............................... 174/65 H |
| 6,002,088 | * 12/1999 | Ehmann ............................ 174/65 G |

FOREIGN PATENT DOCUMENTS

| | | |
|---|---|---|
| 0 442 505 A2 | 2/1991 | (EP) . |
| 0 515 200 A1 | 5/1992 | (EP) . |
| 0528101 | 2/1993 | (EP) . |
| 2323255 | 4/1977 | (FR) . |

\* cited by examiner

*Primary Examiner*—Kristine Kincaid
*Assistant Examiner*—Dhiru R Patel
(74) *Attorney, Agent, or Firm*—Henderson & Sturm LLP

(57) ABSTRACT

The invention relates to a connecting box for fitting a tube to the aperture of a wall. This box includes at least two shells which are connected by a hinge at their common longitudinal joining face and are completed by locking means at their opposing longitudinal joining face, defining, once folded back and locked on one another, a rear part capable of receiving and retaining the end of the tube as well as a front sleeve including a thread designed to receive an integral nut behind the wall or to be screwed in the possible tapping in the aperture. The edges of the joining faces at least of the rear portion and the supporting surface delimiting the sleeve and this rear portion are equipped with a continuous strip or a layer of flexible sealing material.

20 Claims, 3 Drawing Sheets

SEALED CONNECTING BOX FOR FITTING A TUBE TO AN APERTURE OF A WALL

CROSS-REFERENCE TO RELATED APPLICATIONS

This application is a continuation of PCT/IB97/01285 filed Oct. 17, 1997.

STATEMENT REGARDING FEDERALLY SPONSORED RESEARCH OR DEVELOPMENT

Not Applicable.

BACKGROUND OF THE INVENTION

1. Field of the Invention

The present invention relates to a sealed connecting box for fitting a tube to a smooth or screw-threaded aperture of a wall and, more particularly, a connecting box with gaskets of a ringed conduit for protecting a bundle of electric wires in a wall aperture through which the wires pass, this box possibly also being used for the direct sealed passage of an electric cable or a tube through this aperture.

2. Description of the Prior Art

Ringed tubes, that is those of which the shape resembles a succession of interconnected rings, are usually produced from plastics material such as extruded polypropylene. These tubes allow the production of complex networks of protective sheaths for bundles of electric wire or cables within a building, an aircraft or a car, in particular in the engine compartment. In fact, in view of the small amount of space available, these sheaths or pipes must be able to follow non-rectilinear walls closely and to skirt round the various elements encountered. With these tubes it is possible to produce curves of which the radius of curvature is smaller than twice their diameter without the curves being deformed inwardly or even breaking.

To connect such a tube to the aperture of a wall, it is normal to use a stuffing box consisting of five parts: a tubular body with a front thread and a rear thread separated by a supporting flange, an internal gripping joint, a bushing nut engaging on the rear thread of the body and gripping the joint against the central ringed tube, a circular crown-shaped joint being interposed between the flange of the body and the rear face of the wall and, finally, a flat nut engaged at the front of the wall on the front thread of the body once the body has passed through the aperture. A stuffing box of this type is described in the document EP-A-0 515 200.

In order to fit this stuffing box correctly, the bushing nut and the gripping joint are first slipped over the ringed tube and the wires. The circular joint is then fitted on the body, the front portion of which is screwed into the wall to be traversed in order to compress this joint. The wires can then be passed through the body and the flat nut which is then screwed on the front portion of the body to prevent this body from being released from the wall. The ringed tube can then be inserted in the rear portion of the body and the gripping joint is brought into contact therewith. Finally, the bushing nut can be brought into contact with the gripping joint and this nut can be screwed on the rear portion of the body while compressing and deforming the joint, simultaneously producing the seal and the tensioning of the ringed tube in the body.

Although the strength of the ringed tube is relatively satisfactory with regard to the seal between, on the one hand, the external environment and, on the other hand, the interior of the ringed tube and the rear zone of the wall which frequently corresponds to the internal space of a box which is itself sealed, it is noted that it is directly linked to the gripping force of the bushing nut which, in practice, is never constant. In particular, installation of this stuffing box as described hereinbefore is time-consuming and awkward because, as the parts are circular, they are fitted by being slipped through. Furthermore, there is a risk that one of the parts, in particular the gaskets, will be forgotten or lost. Finally, stuffing boxes are expensive to use insofar as a stock of five parts each having a distinct reference has to be supplied and maintained.

To this end, the document EP-A-0 442 505 proposes a plastic connecting box for undulating pipes having the form of two shells which are substantially symmetrical about a plane passing through the longitudinal median axis of the ringed tube, said shells being folded round a hinge in the form of a film of connecting material along a common longitudinal joining face. These shells are each provided with a hook and a locking window located on the longitudinal joining face opposite that of the hinge, the hook engaging in the window when the shells are folded over one another in their median joining plane. Once closed, this connecting box has a rear section intended to accommodate the end of the ringed tube, the internal space of this section comprising transverse ribs which are interposed between the grooves of the tube in order to retain it. This section is extended at the front by a smaller diameter sleeve having an external thread designed to be passed through the aperture in the wall. The interface between the rear section and the front sleeve forms a circular crown-shaped surface for supporting the box against the wall.

Furthermore, a nut is provided which is also in the form of two semicircular elements connected on one side by a film hinge and locked on the other side by a hook engaging in a window. In order to rigidify this nut once the elements are closed, a six-sided external shell of which one of the sides is open for passage over the electric cables and wires is placed on the periphery.

Although this connecting box is easier to fit as it no longer has to be slipped through but can be closed round electric cables and lines, there is no gasket between the box and the wall nor between the tube and/or cables and the box. Therefore, this box cannot be used in difficult damp and/or dusty environments. Furthermore, it should be noted that the nut is supplied separately from the box.

BRIEF SUMMARY OF THE INVENTION

The present invention relates to a connecting box for fitting a tube to the aperture of a wall which, on the one hand, effectively and rigidly holds the end of the tube against the wall in the region of the aperture traversed by the electric cables and wires issuing from the interior of the tube. However, this firm hold must not create residual tension in the tube as this would be harmful in the long term. On the other hand, this connecting box should also provide a protective seal which is reliable over time for internal electric cables and wires, in particular the seal between the tube and the box and between the box and the wall.

Furthermore, this connecting box should be particularly easy to use, in particular by being fitted without being slipped directly over the already positioned tubes and/or cables. Furthermore, it must be possible to produce, store and deliver this box completely without accessories which may be forgotten or lost.

Finally, this box must be adapted for simple mass production at low cost, in particular by injection moulding of plastics material.

These objects are achieved with a connecting box for fitting a tube to the aperture of a wall having the form of at least two shells which are connected by a hinge at their common longitudinal joining face and are completed by locking means at their opposing longitudinal joining face, defining, once folded back and locked on one another, a rear part comprising at least one recess capable of receiving and retaining the end of the tube as well as a front sleeve delimited from the rear portion by an external surface supporting the box against the wall, comprising a thread designed to receive an integral nut behind the wall or to be screwed in the possible tapping in the aperture and of which the internal conduit communicates with the recess since the edges of the joining faces at least of the rear portion and the supporting surface are equipped with a continuous strip or a layer of flexible sealing material.

The strips of flexible material arranged on the edges of joining faces, whether in the centre of the edge or at one of the sides, therefore seal the recess and thus allow the orifice of the tube to be located more or less forward in this recess. The circular strip or the circular crown-shaped layer on the supporting surface thus constitutes the gasket with regard to the wall which cannot be forgotten or lost as it is already permanently on the box.

When the box is injection-moulded from rigid thermoplastic material, the flexible material is preferably a plastics material which is duplicate-moulded or bi-injected on the box. For example, an elastomer can be duplicate-moulded over a polypropylene or polyamide or polyester moulded connecting box. In particular, an elastomer known by the name of EPDM can be moulded on a polypropylene, but an elastomer known by the name of SEBS is preferably moulded on a polyamide or a polyester. This choice of material allows strong cohesion between the rigid material constituting the connecting box and the flexible sealing material. The additional gaskets according to the invention are fixed permanently to the box and cannot be lost.

Advantageously, the sleeve extends the single recess in the tubular rear part directly and coaxially, the box thus being substantially symmetrical about a plane passing through the median longitudinal axis of the tube also defining the plane which joins the shells. The box can therefore consist of two symmetrical shells. It is preferable if the box comprises three shells, a base shell forming half of the rear portion and the sleeve, a first half shell forming the other half of the rear portion in the region where it is connected to the base shell at a first longitudinal joining face and a second half shell forming the other half of the sleeve where it is connected to the base shell at the second longitudinal joining face opposed to the first.

This structure allows the connecting box to be installed easily insofar as, in a first stage, the threaded sleeve can be closed completely for screwing into the aperture while independently assembling the rear portion partially on the end of the ringed tube so torque is not transmitted to this ringed tube during the screwing operation. In a second stage, this rear portion can then be closed completely in order to grip the sealing strips which will not have been affected at all.

Locking means such as a hook are preferably also provided at one of the joining faces in association with a hoop or a window in the opposing joining face, in the vicinity of the hinge or hinges which can thus be reduced to mere bridges of plastics material. These mating locking means thus serve to strengthen the box even if one of these hinge bridges breaks, but also allow correct crushing of the strip of flexible material acting as an edge gasket in this region, confirming the general tightness of the connecting box.

If the tube to be connected is a ringed tube held in the box by transverse ribs made in the internal wall of the recess and the locking means in the region of the rear portion consist of a respective hook at a joining face of one of the shells associated with a hoop or window made in the opposing joining face of the other shell, the hook preferably has two notches at different heights, on either side of the supporting bar if desired.

When the connecting box is fitted, in particular after having placed the end of the ringed tube in the recess in the rear portion, only the first notch of the hook can first be engaged in the hoop in order to hold this tube longitudinally without gripping it. The connecting box can thus be turned on itself, in particular to screw its sleeve in the aperture in the wall, without any torque being transmitted to the tube. Once the sleeve has been fixed in the wall, the second notch can be engaged for strong gripping of the rear portion of the box on the tube. This second notch therefore allows locking means to be defined for final gripping with predetermined constant adequate force for all operators, ensuring effective crushing of the strips of flexible material, therefore confirmation of the tightness in this region.

Owing to the existence according to the invention of strips of flexible sealing material in the rear portion of the box which allow the end of the ringed tube to be positioned more or less forward in the recess, this recess can advantageously have two or more longitudinal sections of different diameters, each comprising several, that is 2 to 4 and preferably 3, transverse ribs for holding a ringed tube of corresponding diameter.

The connecting box is therefore more flexible in use because, by itself, it can receive two or even more types of ringed tubes: a tube of large diameter for a thick bundle of cables and a tube of smaller diameter for a limited number of wires.

One of the shells of the connecting box is preferably connected by a string to the nut of the box, this nut having the form of two shells which are connected at a common side by a film hinge and are substantially symmetrical relative to a joining plane passing through the median longitudinal axis of the tube, the internal radial faces of the elements being semicircular with a mating threaded portion of which the external radial faces are substantially semi-octagonal and of which each of the two sides is provided with mating locking means on the side corresponding to the other element.

When structured in this way, the complete box can be bi-injected or moulded then duplicate-moulded in one operation with the result that the nut required for securing this box in the wall, therefore for sealing it, cannot be forgotten or lost. Furthermore, this connecting box can be stored and sold under a single reference and this reduces the costs and risks of errors, particular if the box can receive tubes of different diameters.

Locating means such as a tenon associated with a locating opening are usefully provided, for example in parallel with each locking means, on the edges of the joining faces of the shells. In particular, these locating means withstand any shearing stress likely to be applied to the box in its joining plane. As the joining faces are thus held reliably opposite one another, the reliability of the seal provided by the strips of flexible material in this region is improved.

The process for manufacturing the connecting box advantageously involves moulding, from a thermoplastic polymer, the shells which are spread out between two moulding blocks of which the first movable block bears the imprint of the external surfaces of the box and the second, for example stationary injection block, bears the imprint of the internal surfaces of the box, opening the blocks while holding the shells in the first block, moving this first block in front of and then closing it against a third block and moulding a flexible plastics material at least on the edges of the joining faces of the shells forming the rear portion and on the surface supporting the box.

This process minimizes the number of drawers to be arranged in the blocks in order to modify the imprints so as to create the second space for duplicate moulding, which is found to be highly useful when a plurality of boxes is moulded in parallel within a set of moulding blocks.

BRIEF DESCRIPTION OF THE SEVERAL VIEWS OF THE DRAWINGS

The invention will be understood better by examining an embodiment given as a non-limiting example and illustrated in the accompanying drawings.

DETAILED DESCRIPTION OF THE INVENTION

Figure 1:
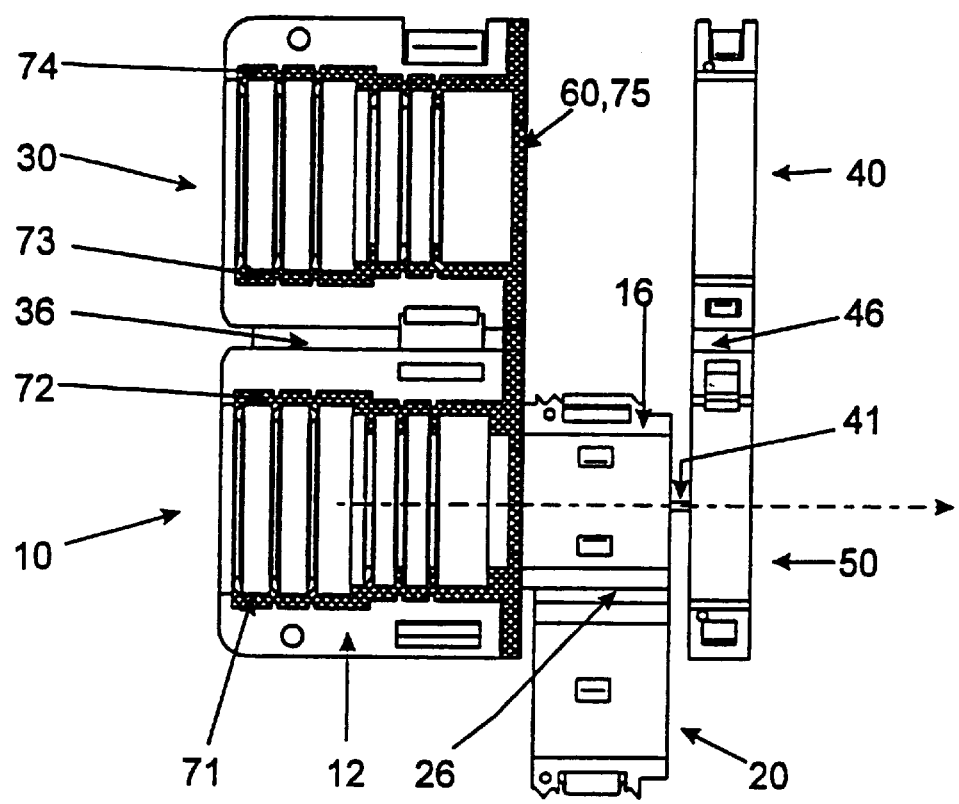
FIG. 1 is a plan view of the open box, that is in the direction of its internal surfaces.
Figure 2:
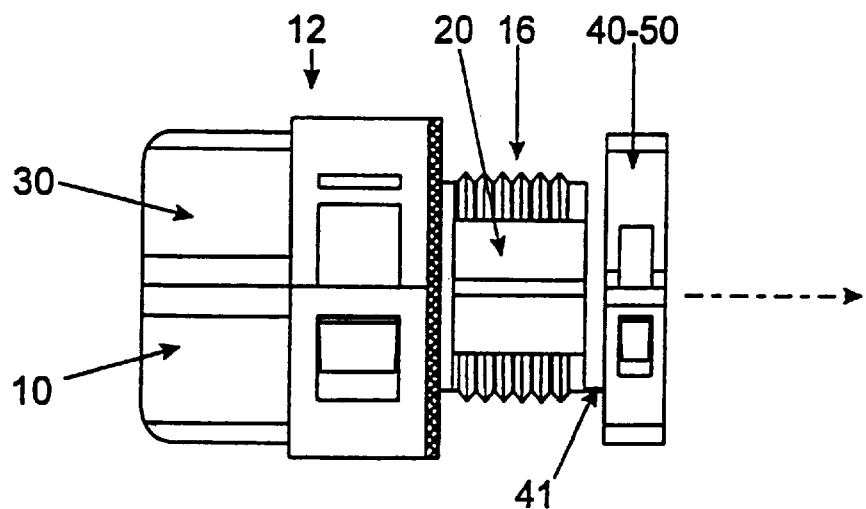
FIG. 2 is a plan view of the closed box.
Figure 3:
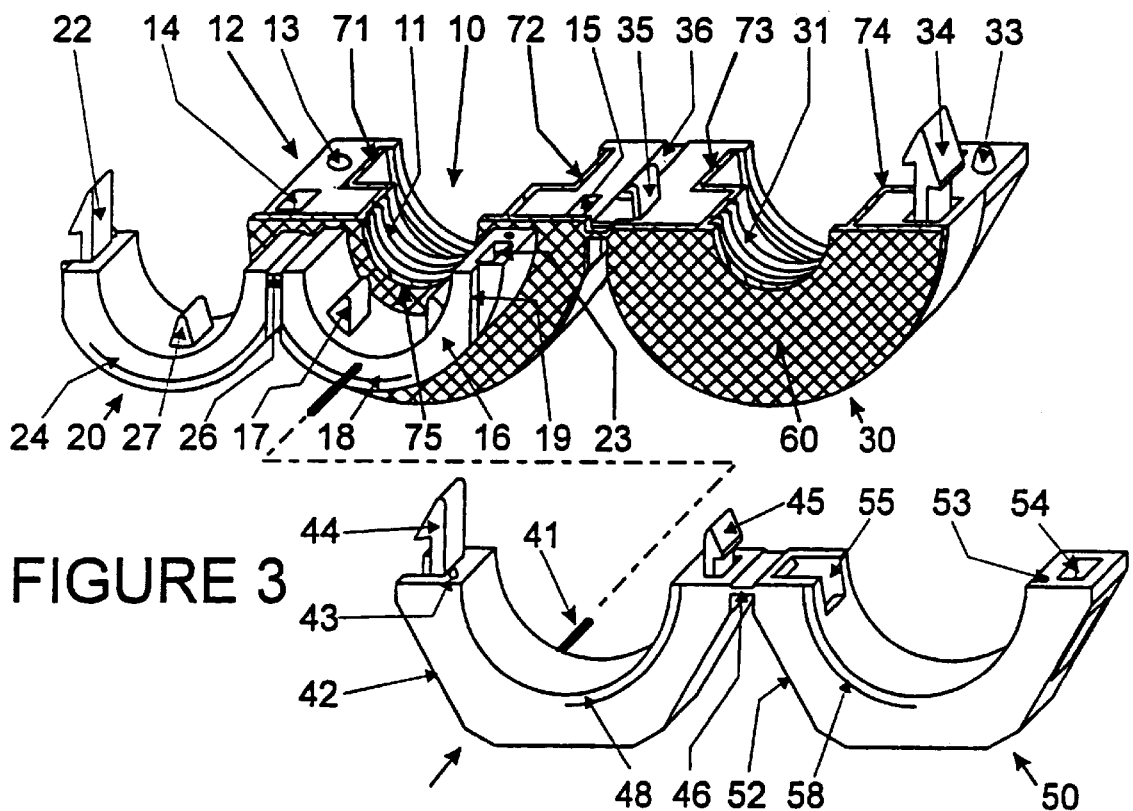
FIG. 3 is a perspective view of the front of the open box in which its nut has been shifted for the sake of clarity.
Figure 4:
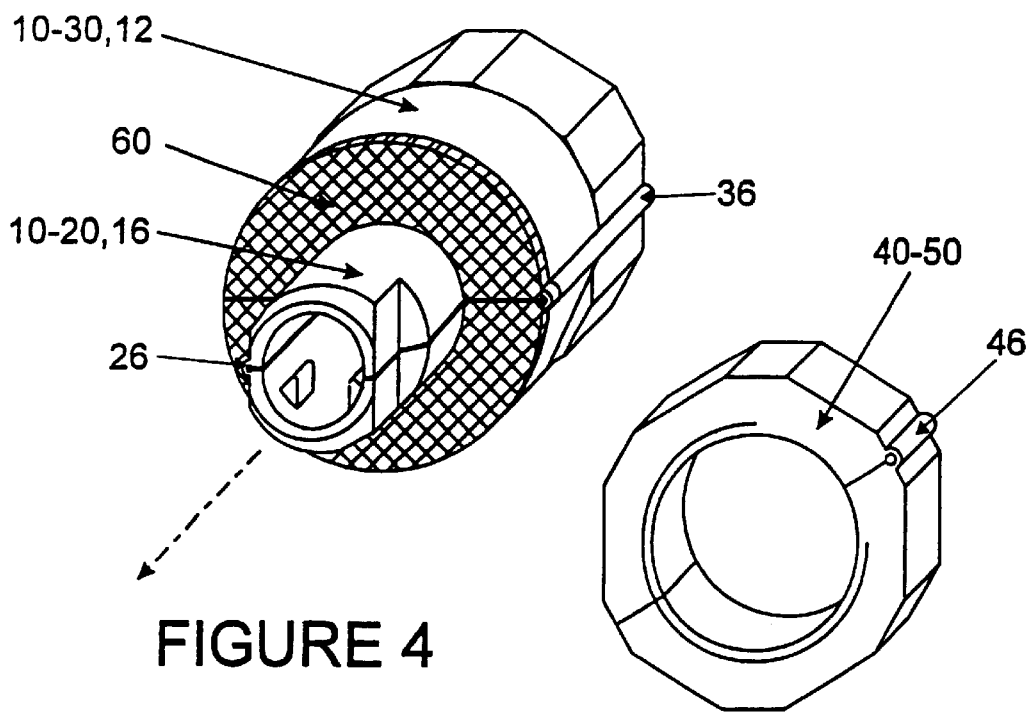
FIG. 4 is a perspective view of the front of the closed box.

The connecting box according to the invention is illustrated in FIGS. 1 and 3 in the spread-out state as manufactured and sold and in FIGS. 2 and 4 in the closed state for holding a tube in the aperture of a wall, a particular reference numeral always designating the same box in the drawings.

In the closed state, this connecting box has a rear portion 12 containing an internal recess intended to receive the joining part of a ringed tube and, directly in the extension of this portion 12, a front sleeve 16 with an external thread intended to be inserted, that is screwed, through the aperture of the wall, as well as a flat nut comprised of two shells 40, 50 intended to be engaged on the thread of the sleeve and thus rigidly hold the connecting box in the wall. In a first stage, this nut comprised of two shells 40, 50 is connected to the sleeve 16 by a string 41 which can be broken by hand.

This connecting box is moulded from a thermoplastic polymer in the state where it is spread out in the form of five rigid shells: a base shell 10, a half shell 20 as sleeve 16, a half shell 30 as rear portion 12 and two nut shells 40, 50.

More particularly according to the invention and taking as a reference the median longitudinal axis of the base shell 10 orientated from the rear portion 12 toward the sleeve 16, the half shell 20 is connected to the base shell 10 by a hinge 26 at the right-hand lateral joining face of the sleeve 16 whereas the half shell 30 is connected to the base shell 10 by a hinge 36 on the opposing joining face of the rear portion 12, that is at the left-hand joining face. The nut shells 40 and 50 are interconnected by a hinge 46, one of the shells, for example 50, itself being connected to the base shell 10 by a string 41. The hinges 26, 36 and 46 each consist of a fine bridge of plastics material to facilitate production. This configuration shows clearly the front face 60 of the rear portion 12 intended to rest against the wall.

As shown more clearly in FIGS. 1 and 3, the half shell 20 has, at its joining face remote from that of the hinge 26, that is at its right-hand external joining face, a hook 22 intended to engage, when this half shell 20 is folded over the base shell 10, in a blind aperture 23 or in a traversing aperture called a window made in the thickness of the left-joining face of the sleeve 16 of the base shell 10. In order to position this half shell exactly over the base shell, a locating tenon can be provided next to the hook 22 and inserted in a corresponding locating aperture next to the window 23.

Furthermore, the external surface of the half shell 20 has threaded portions 24 intended to complete the threaded portion 18 provided on the external surface of the sleeve 16 of the base shell 10. Once the half shell 20 has been folded over the base shell 10, these threaded portions form a helical thread capable of receiving the nut comprised of two shells 40, 50. This external surface can also have two frontal flattened regions 19 arranged symmetrically about the median plane. These flattened regions facilitate engagement of the internal thread of the nut on the external thread of the sleeve of which the shells cannot be perfectly aligned at this moment. These flattened regions also allow this tenon to be rotationally engaged by means of a tool, for example during the tightening of the nut comprised of two shells 40, 50.

Finally, the internal surface of the half shell 20 can have a stud 27 which, in correspondence with similar studs 17 provided in the internal surface of the sleeve 16 of the base shell 10, allows a single multi-strand cable to be located and held firmly. In particular, these studs have a cross section in the form of an arc of a circle or an oblique triangle in the screwing direction to allow the threaded sleeve to be fitted in a tapped aperture without inducing torque in a bundle of traversing wires.

As shown more clearly in FIG. 3, the left-hand joining face as shown in the reference direction of the box (therefore from the right-hand side in FIG. 3) of the half shell 30 has a main double-notched hook 34 intended to be inserted in a window 14 provided in the thickness of the right-hand joining face (to the left of FIG. 3) of the rear portion 12 of the base shell 10. This double-notch hook 34 therefore allows the half shell 30 to be prepositioned loosely over the base shell 10 then, in a second stage, allows the two shells to be gripped together vigorously. To cancel any positioning play which may exist in the region of the hooks, there is also provided on this left-hand joining face of half shell 30 a locating stud 33 intended to be inserted in an aperture 13 correspondingly provided in the right-hand joining face of the portion 12 of base shell 10.

More particularly according to the invention, a second smaller hook 35 is also provided on the left-hand joining face of the half shell 30 in the vicinity of the film hinge 36. This secondary hook 35 is intended to engage in a window 15 provided symmetrically to the hook 35 relative to the hinge 36 in the left-hand joining face of the rear portion 12 of base shell 10. An accidental breakage of the film hinge 36 does not affect the general rigidity of the connecting box.

As shown more clearly in FIG. 2, the external face of the half shell 30 and of the portion 12 of the base shell 10 has, from back to front respectively, a first octagonal section capable of being grasped by a tool followed by a circular section where the locking means formed by the hooks 34, 35 penetrating in their window 14, 15 respectively can be seen.

According to the invention and as shown more clearly in FIGS. 1 and 3, the interior of the portion 12 has an internal recess in two sections of different diameter, each section being provided with ribs 11, three side-by-side in parallel in this instance, intended to engage between the grooves of the tube in order to hold it longitudinally. As illustrated, this connecting box can therefore receive two different ringed tubes: either a wide tube constituting a main branch of an electric bundle or a small diameter tube constituting a secondary branch of the bundle.

More particularly according to the invention, the connecting box described hereinbefore has a certain number of zones covered with flexible elastic sealing material.

In particular, this sealing material appears first on the front supporting surface in a layer 60 of which the external radius corresponds substantially to the radius of the circular section of the rear portion 12 and of which the internal radius is, on the other hand, smaller than the last section of the internal recess thus forming an internal radial sealing flange 65. The layer 60 provides a seal between the environment and the aperture of the wall. The flange 75 slightly improves the internal seal of the connection in the region of the wires on either side of the wall but is intended to provide a seal round a single multi-strand traversing cable.

In addition, the joining faces of the portion 12 of base shell 10 and of half shell 30 are completed, on the internal side, by a strip of flexible sealing material, 71, 72, 73 and 74 respectively. In particular, the joining strips 71 and 74 are pressed against one another by the gripping force of the hook 34 engaged in its window 14 whereas the joining strips 72 and 73 are pressed against one another just by the mating hook 35 engaged in its window 15. These strips of flexible material effectively seal the internal recess at the rear portion 12 receiving the end of the ringed tube.

More particularly according to the invention, the connecting box also comprises two shells 40, 50 which, when folded over one another, form a nut which is ready for use. These two shells each have a radial internal surface in the form of an arc of a circle completed by a threaded portion 48, 58 mating with the external thread of the tenon 16. These two shells also have two substantially identical semi-octagonal external surfaces 42, 52 which allow this nut to be grasped by a tool.

In order to rigidify this nut, a locking means is provided at each of the two joining faces. As illustrated, a first main hook 44 is thus provided on the shell 40 at its joining face remote from that of the film hinge 46, this hook being intended to engage in the window 54 in the other shell 50. If desired, a locating stud 43 can also be provided next to the hook 44, which engages in an aperture 53 adjacent to the window 54. Symmetrically about the film hinge 46, a secondary hook 45 is provided on the shell 40 and a corresponding window 55 of the shell 50.

This connecting box is produced by moulding plastics material in an injection-moulding machine. More particularly according to the invention, this moulding operation is carried out in two stages. Firstly, the five interconnected rigid shells are moulded between two upper blocks of which the first movable block comprises an imprint corresponding to the external surface of the box spread open, as illustrated in FIG. 1, and the second stationary block for first injection comprises an imprint corresponding to the internal surface shown more clearly in FIG. 2. The blocks are then opened and the first block still containing the boxes is displaced by rotation round a point substantially adjacent to the median point of its lower face in order to be brought in front of a third stationary lower block for second injection subjacent to the second block against which it is closed. The flexible plastics material can therefore be moulded in order to produce the front supporting surface 60, 75 and the sealing strips 71–74 on the joining faces of the rear portion 12. The connecting box produced in this way is ejected into a tank then stored and sold in a single reference in the open state as illustrated in FIG. 1. A further movable block, identical to the first to which it is connected symmetrically about the pivot point was simultaneously presented then closed against the second block for simultaneous moulding of the rigid shells of the following box. Instead of being disposed in a vertical plane, these blocks can also be arranged in a horizontal plane.

Owing to this connecting box according to the invention, the entire electric bundle is first installed in its environment (that is within a terrestrial vehicle or in any other place), by passing the wires through apertures in the walls without worrying about their protection. The electric bundle fitted in this way can then be tested electrically with regard to its continuity and insulation. Once the bundle is considered satisfactory, a connecting box is fitted in the region of each wall aperture.

For this purpose, the shells 40, 50 are first separated and are temporarily kept in the vicinity in the open state. The end of a ringed tube is then fitted in the rear portion 12 of the base shell 10 and the half shell 30 is closed over the base shell 10 to the first notch of the hook 34. The half shell 20 is then closed over the base shell 10 to form the threaded sleeve 16. The connecting box is then turned freely round its median longitudinal axis without inducing torsion into the ringed tube. This allows the sleeve 16 to be screwed into the thread of the aperture of the wall until the layer of flexible material 60 is effectively crushed against the corresponding surface of the wall. The shells 40, 50 are then closed over the wires issuing at the rear of the wall to constitute a nut which is screwed on the sleeve 16 thus locking the connecting box in position. The rear portion 12 then has to be gripped a last time to engage the second notch of the hook 33, thus confirming the seal provided by the flexible joining strips 71–74. If the aperture does not comprise a thread, the sleeve is passed through and is tightened against the wall directly with the nut formed round the wires.

As shown, this connecting box is not only simple to position once the bundle of cables has been fitted but also provides an excellent seal between the interior of the protective network of ringed tubes and the environment.

Figure 5:
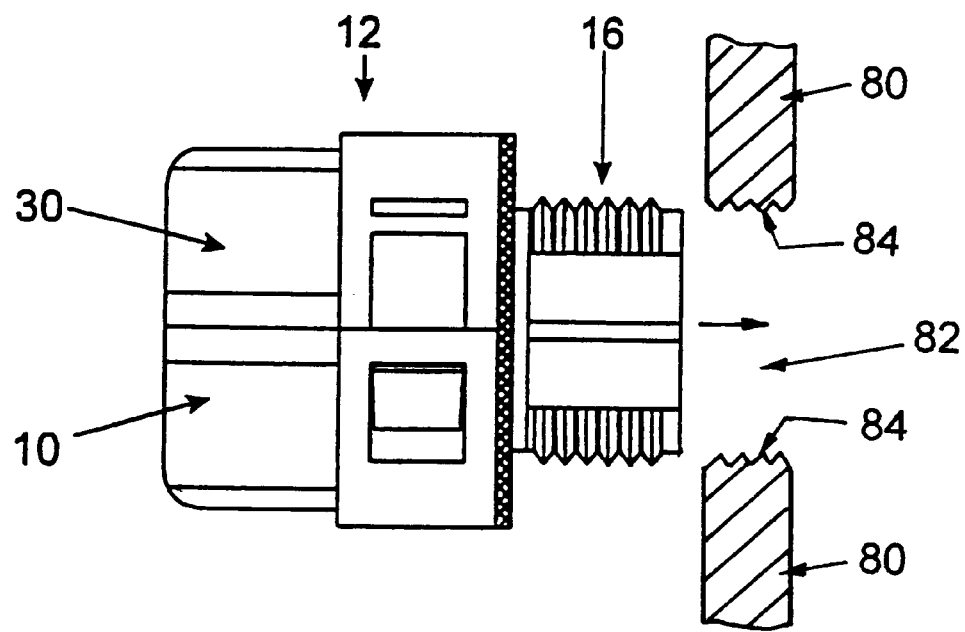
FIG. 5 is a partial plan view of the closed box and a wall including a tapped aperture.

FIG. 5 illustrates how the threaded sleeve 16 could also be screwed into an aperture 82 formed in a wall 80. The aperture 82 is tapped to include threads 84 to engage the threaded sleeve 16.

Numerous improvements can be made to this connecting box in the scope of the invention.

In particular, the rear portion 12 can be transversal to give this box a T-shape for connecting two ringed tubes end-to-end with a branch passing through the wall within the sleeve 16. Alternatively, the rear portion 12 can have the form of a V orientated toward the sleeve for two tubes arriving side-by-side or even three tubes arranged like the edges of a pyramid shape.

The invention is not limited to locking means comprising hooks penetrating in windows, and the box can be closed by other means such as a rod having a vertical row of downwardly orientated circular notches and penetrating in a blind or traversing circular aperture, the notches hooking in the internal wall of the aperture.

In the case of smooth protective tubes, the ribs 11 can have an oblique triangular section orientated toward the sleeve in order to grip and fasten the tube. Alternatively, the ribs can be replaced by a row of tube hooks also orientated toward the sleeve.

What is claimed is:

1. A connecting box for fitting a tube to an aperture of a wall, comprising shells which are connected by a first hinge at a first common longitudinal joining face and which are completed by mating locking means at a second opposing longitudinal joining face, defining, when folded back and locked on one another, a rear portion comprising at least one recess capable of receiving and retaining an end of the tube as well as a front sleeve delimited from the rear portion by an external surface supporting said connecting box against the wall, said front sleeve including a thread designed to receive a nut behind the wall or to be screwed in a tapping in the aperture of the wall and having an internal conduit which communicates with said at least one recess, wherein edges of the joining faces and the external surface supporting said connecting box is equipped with a continuous strip or a layer of flexible sealing material.

2. The connecting box according to claim 1, said connecting box being injection-moulded from rigid thermoplastic polymer, and wherein the flexible sealing material is a flexible plastics material duplicate moulded or bi-injected on said connecting box.

3. The connecting box according to claim 2, wherein said shells are moulded from polypropylene, polyamide or polyester and wherein the duplicate moulded flexible plastics material is an elastomer.

4. The connecting box according to claim 3, wherein said front sleeve directly extends said at least one recess in the rear portion, said connecting box thus being substantially symmetrical about a plane passing through a median longitudinal axis of the tube, wherein said shells comprise, a base shell forming half of the rear portion and of said front sleeve, a first half shell forming the other half of the rear portion in a region where it is connected by the first hinge to the base shell at said first longitudinal joining face, and a second half shell forming the other half of said front sleeve in a region where it is connected by a third hinge to the base shell at a second longitudinal joining face opposed to said first longitudinal joining face.

5. The connecting box according to claim 4, wherein said mating locking means are provided in the vicinity of the first and second hinges.

6. The connecting box according to claim 3, wherein one of said shells is connected by a string to the nut of said connecting box, the nut having the form of two nut shells connecting a common side by a film hinge and being substantially symmetrical about a joining plane passing through a median longitudinal axis of the tube, each of the two nut shells having semicircular internal radial surfaces provided with a mating threaded portion and having external radial surfaces and said two nut shells is provided with mating nut locking means at opposing sides of said two nut shells.

7. The connecting box according to claim 2, wherein one of said shells is connected by a string to the nut of said connecting box, the nut having the form of two nut shells connecting a common side by a film hinge and being substantially symmetrical about a joining plane passing through a median longitudinal axis of the tube, each of the two nut shells having semicircular internal radial surfaces provided with a mating threaded portion and having external radial surfaces and said two nut shells is provided with mating nut locking means at opposing sides of said two nut shells.

8. The connecting box according to claim 2, wherein locating means such as a tenon associated with a locating opening is provided on said second opposing longitudinal joining face joining face of said shells.

9. The connecting box according to claim 2, wherein said front sleeve directly extends said at least one recess in the rear portion, said connecting box thus being substantially symmetrical about a plane passing through a median longitudinal axis of the tube, wherein said shells comprise, a base shell forming half of the rear portion and of said front sleeve, a first half shell forming the other half of the rear portion in a region where it is connected by the first hinge to the base shell at said first longitudinal joining face, and a second half shell forming the other half of said front sleeve in a region where it is connected by a third hinge to the base shell at a second longitudinal joining face opposed to said first longitudinal joining face.

10. The connecting box according to claim 9, wherein said mating locking means are provided in the vicinity of the first and second hinges.

11. The connecting box according to claim 1, wherein the front sleeve directly extends said at least one recess in the rear portion, said connecting box thus being substantially symmetrical about a plane passing through a median longitudinal axis of the tube, wherein said shells comprise, a base shell forming half of the rear portion and of said front sleeve, a first half shell forming the other half of the rear portion in a region where it is connected by said first hinge to the base shell at said first longitudinal joining face, and a second half shell forming the other half of the sleeve in a region where it is connected by a second hinge to the base shell at a third longitudinal joining face opposed to said first longitudinal joining face.

12. The connecting box according to claim 11, wherein said mating locking means are provided in the vicinity of the first and second hinges.

13. The connecting box according to claim 12, said connecting box connectable to said tube held in said connecting box by transverse ribs provided in an internal wall of said at least one recess and of which the mating locking means of the rear portion consist respectively of a hook at one face of one of the base and first half shells associated with a hoop or window provided in an opposing face of the other of the base and first half shells, wherein the hook has two notches at different heights.

14. The connecting box according claim 12, wherein said at least one recess of the rear portion includes at least two longitudinal sections of different diameters.

15. The connecting box according to claim 11, wherein said at least one recess of the rear portion includes at least two longitudinal sections of different diameters.

16. The connecting box according to claim 11, said connecting box connectable to said tube held in said connecting box by transverse ribs provided in an internal wall of said at least one recess and of which the mating locking means of the rear portion consist respectively of a hook at one face of one of the base and first half shells associated with a hoop or window provided in an opposing face of the other of the base and first half shells, wherein the hook has two notches at different heights.

17. The connecting box according claim 16, wherein said at least one recess of the rear portion includes at least two longitudinal sections of different diameters.

18. The connecting box according to claim 1, wherein one of said shells is connected by a string to the nut of said connecting box, the nut having the form of two nut shells connecting a common side by a film hinge and being substantially symmetrical about a joining plane passing through a median longitudinal axis of the tube, each of said two nut shells having semicircular internal radial surfaces provided with a mating threaded portion and having external radial surfaces and said two nut shells is provided with mating nut locking means at opposing sides of said two nut shells.

19. The connecting box according to claim 1, wherein locating means such as a tenon associated with a locating opening is provided on said second opposing longitudinal joining face joining face of said shells.

20. Process for producing a connecting box, said connection box being selected from the group consisting of the connecting boxes according to one of claims 2 to 19 and 9 to 8, comprising the steps of:

moulding, from said thermoplastic polymer, said shells which are spread out between two moulding blocks of which the first block bears the imprint of the external surfaces of said connecting box and the second block bears the imprint of the internal surfaces of said connecting box;

opening the first and second blocks while holding said shells in the first block;

moving the first block in front of and then closing it against a third block; and duplicate moulding said flexible plastics material at least on the edges of the joining faces of the shells forming the rear portion and on the surface supporting said connecting box.

\* \* \* \* \*